(12) United States Patent
Kioski et al.

(10) Patent No.: US 10,148,073 B1
(45) Date of Patent: Dec. 4, 2018

(54) FLEXIBLE CONDUIT SYSTEMS FOR ROUTING CABLES

(71) Applicant: Telect, Inc., Liberty Lake, WA (US)

(72) Inventors: Bryan Joseph Kioski, Spokane, WA (US); Walter Dean Takisaki, Spokane Valley, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/962,350

(22) Filed: Apr. 25, 2018

(51) Int. Cl.
*H02G 3/30* (2006.01)
*F16L 3/015* (2006.01)
*F16L 11/11* (2006.01)
*H02G 3/04* (2006.01)

(52) U.S. Cl.
CPC ............ *H02G 3/0468* (2013.01); *F16L 3/015* (2013.01); *H02G 3/30* (2013.01); *F16L 11/11* (2013.01); *H02G 3/0456* (2013.01)

(58) Field of Classification Search
CPC ...... H02G 3/0468; H02G 3/30; H02G 3/0456; F16L 3/015; F16L 11/11
USPC ....................................................... 174/71 R
See application file for complete search history.

(56) References Cited

U.S. PATENT DOCUMENTS

| | | | | | |
|---|---|---|---|---|---|
| 3,705,949 | A | * | 12/1972 | Weiss | H02G 3/045 174/101 |
| 4,278,834 | A | * | 7/1981 | Boundy | H02G 3/288 174/496 |
| 4,856,765 | A | * | 8/1989 | Kohno | A47C 3/20 267/166 |
| 6,365,834 | B1 | * | 4/2002 | Larsen | H02G 3/0443 174/100 |
| 6,814,244 | B1 | * | 11/2004 | Hathcock | E05D 15/502 211/26 |
| 7,963,486 | B2 | * | 6/2011 | Wilson | H04Q 1/062 174/101 |
| 8,882,051 | B2 | * | 11/2014 | Bleus | H02G 3/30 211/26 |
| 9,054,506 | B2 | * | 6/2015 | Krietzman | H02G 3/0475 |
| 2005/0115737 | A1 | * | 6/2005 | Levesque | H02G 3/0493 174/100 |
| 2011/0174534 | A1 | * | 7/2011 | Krietzman | H05K 7/18 174/520 |

* cited by examiner

*Primary Examiner* — Michael F McAllister
(74) *Attorney, Agent, or Firm* — Lee & Hayes, PLLC

(57) ABSTRACT

A conduit for routing connectivity cables. The conduit including a body extending a longitudinal length and having an opening extending at least a portion of the longitudinal length. The body may be flexible about a center axis of the body, the center axis extending the longitudinal length. A gate may be pivotably attached to a portion of the body. The gate pivotable about the portion of the body while the body is flexed about the point on the center axis.

21 Claims, 14 Drawing Sheets

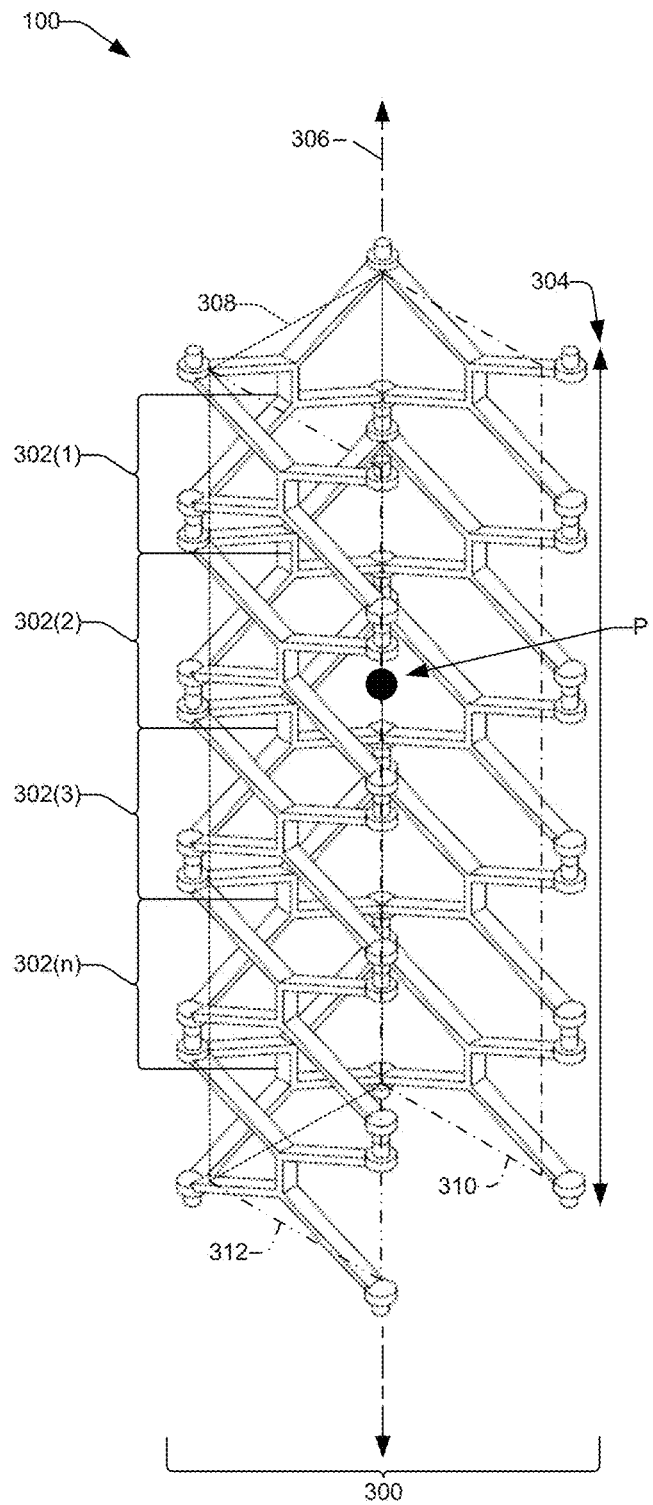
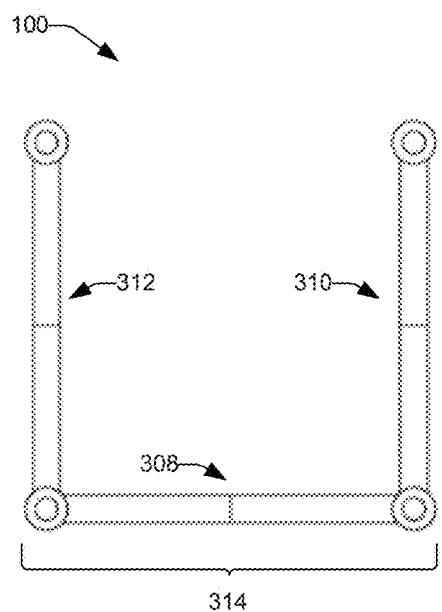
FIG. 3B
FIG. 3A

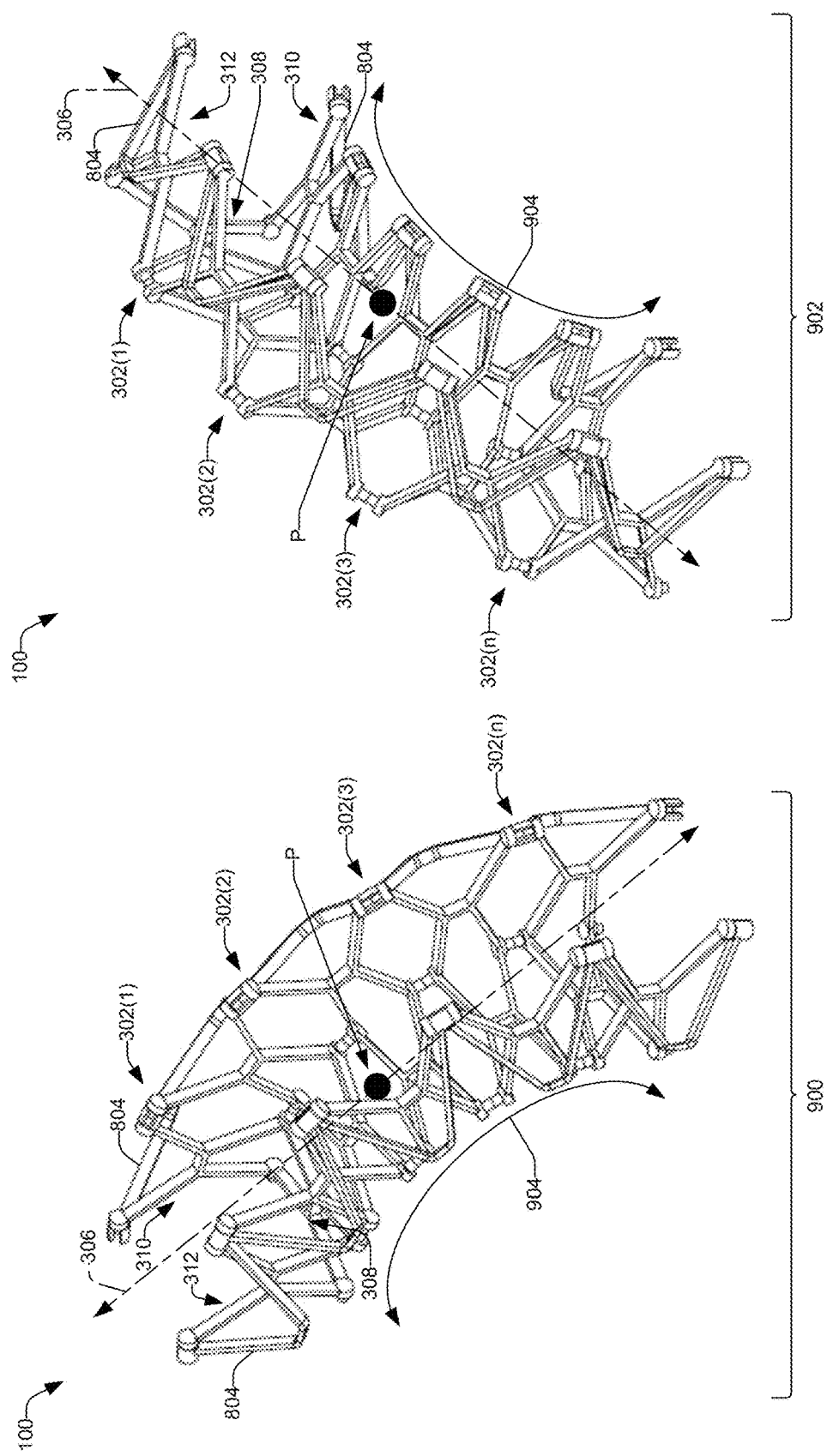

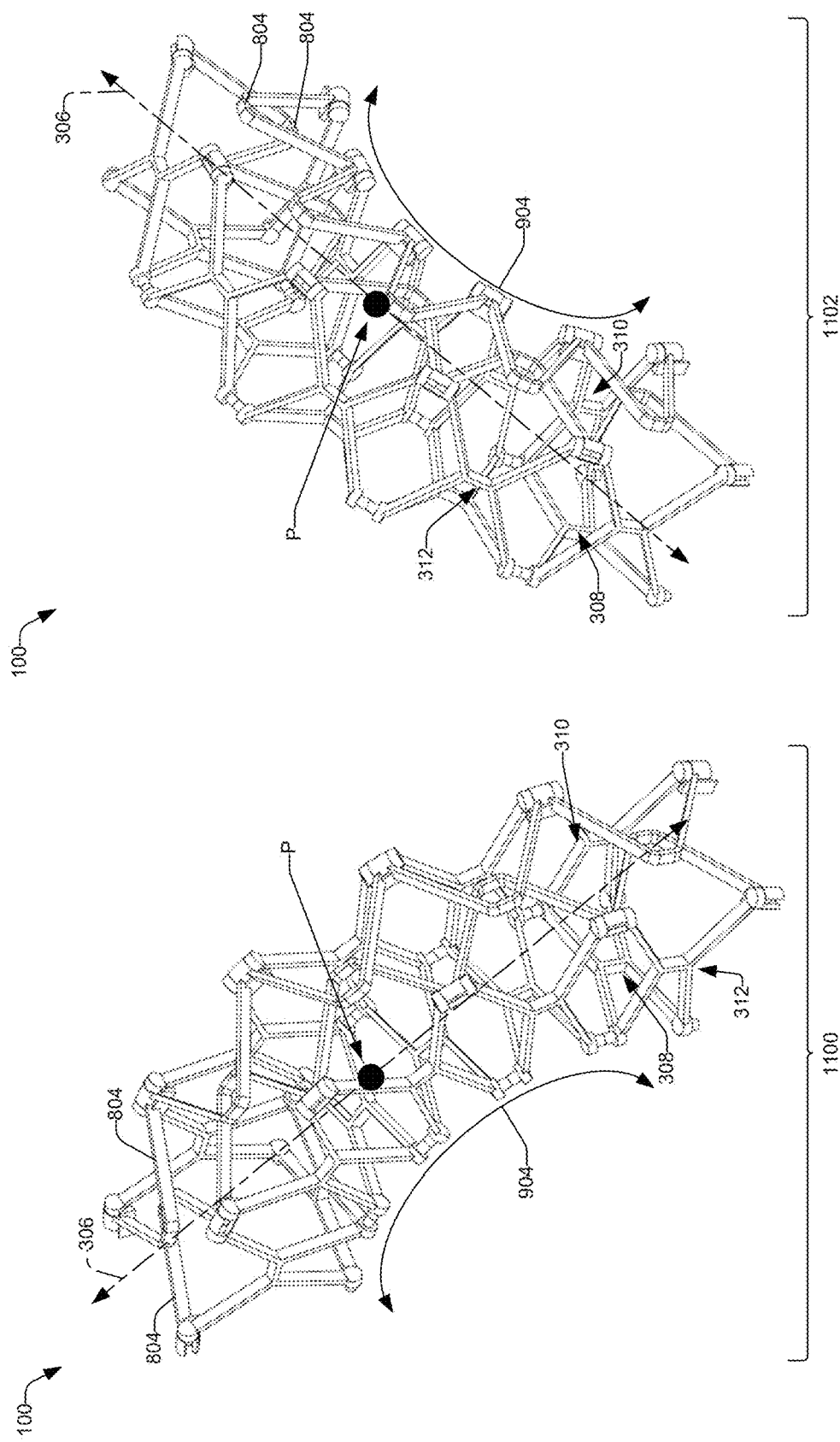

FLEXIBLE CONDUIT SYSTEMS FOR ROUTING CABLES

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

In a typical telecommunications facility, a trough system is used to route the fiber optic cables. Generally, the trough system is located overhead and over the location of the fiber optic racks, cabinets, and other equipment. The trough system in even a small telecommunications facility can be substantial, requiring significant time and expense to install.

Some trough systems use tubing (e.g., split tube, split wire loom tubing, split corrugated loom tubing, etc.), adding to the assembly time and expense. For example, some trough systems may use split tubing to manage and organize optical fibers exiting out of the trough system located overhead to another location, to another piece of equipment, to another trough system, etc. in the telecommunication facility. The split tubing is often extruded and relatively stiff. Users (e.g., technicians, installers, mechanics, etc.) may be required to run their hands along the inside of the split of the tube which can be difficult and unpleasant to manage and organize optical fibers in the split tube. For example, the inside of a split tube often has rough sharp edges, restricting the hands of the users as they manage and organize optical fibers in the split tube.

Thus, there remains a need to develop new conduit formed of materials which are much more easy and pleasant to use than existing tubes, and/or are more cost effective than existing tubing.

BRIEF SUMMARY

This Brief Summary is provided to introduce simplified concepts relating to a conduit for routing cables which are further described below in the Detailed Description. This summary is not intended to identify essential features of the claimed subject matter, nor is it intended for use in determining the scope of the claimed subject matter.

This disclosure relates to conduit for routing cables that are relatively more easy and pleasant to use than existing tubes (e.g., split tube, split wire loom tubing, split corrugated loom tubing, etc.). Generally, the conduit includes a bottom surface including consecutively connected bottom springs extending a longitudinal length, a first side surface including consecutively connected first side springs extending the longitudinal length, and a second side surface including consecutively connected second side springs extending the longitudinal length. The bottom surface, the first side surface, and the second side surface may be flexible about a point along a center axis of the conduit. A gate may be pivotably attached to the first side surface and/or the second side surface and may pivot between an open position and a closed position while the bottom surface, the first side surface, and the second side surface are in a flexed position, as well as when the bottom surface, the first side surface, and the second side surface are in an unflexed state (i.e., relaxed, natural resting state). An advantage of such a conduit is that the conduit provides improved installation attributes, such as eliminating a split having rough sharp edges. For example, because the conduit is flexible about a point along the center axis of the conduit and includes a gate that can be pivoted between an open position and a closed position while the conduit is flexed, this allows a user (e.g., technicians, installers, mechanics, etc.) to manage and organize optical fibers in the conduit with greater ease and lower risk of harm to the user's hands. Accordingly, a user may flex the conduit along a path, pivot the gate between an open position and a closed position while the conduit is flexed along the path, and manage and organize optical fibers in the conduit, via the open gate, without causing harm to the user's hands while passing along the inside of the conduit.

In an embodiment, a conduit includes a first member and a second member. The first member may include a first bottom spring having a first end opposite a second end, a first side spring extending from the first end of the first bottom spring, and a second side spring extending from the second end of the first bottom spring. The second member may include a second bottom spring having a first end opposite a second end, a third side spring extending from the first end of the second bottom spring, and a fourth side spring extending from the second end of the second bottom spring. A bottom link may be attached between the first bottom spring and the second bottom spring. A first side link may be attached between the first side spring and the third side spring. A second side link may be attached between the second side spring and the fourth side spring. The springs of the first and second members allow the first and second members to be flexible with respect to each other about a center axis of the conduit, which axis extends through the longitudinal length of the conduit. At least one gate may have a first end pivotably attached to a top portion of the first side spring and pivotably attached to a top portion of the third side spring. A second end of the at least one gate may be pivotable about the top portions of the first side spring and the third side spring regardless of whether the first member and the second member are flexed or unflexed about a point along the center axis of the conduit.

In an embodiment, a conduit includes a bottom surface, a first side surface, and a second side surface extending a longitudinal length. The bottom surface may include a first bottom spring, a second bottom spring, and a bottom link attached between the first bottom spring and the second bottom spring. The first side surface may include a first side spring, a second side spring, and a side link attached between the first side spring and the second side spring. The second side surface may include a third side spring, a fourth side spring, and a side link attached between the third side spring and the fourth side spring. The springs of the bottom surface, first side surface, and the second side surface may provide for the bottom surface, the first side surface, and the second side surface to be flexible about a center axis of the conduit. At least one gate may pivotably attach to a top portion of the first side surface or pivotably attached to a top portion of the second side surface. The at least one gate may be pivotable between an open position and a closed position regardless of whether the bottom surface, the first side surface, and the second side surface are flexed or unflexed about a point along the center axis of the conduit.

In an embodiment, a conduit includes a body and a gate. The body extending a longitudinal length and having an opening extending at least a portion of the longitudinal length. The body may be flexible about a center axis of the body extending the longitudinal length. The gate may include a first end opposite a second end. The first end of the gate may be pivotably attached to a portion of the body, and the second end of the gate may be pivotable about the portion of the body regardless of whether the body is flexed or unflexed about a point along the center axis of the body.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3A illustrates a perspective view of an embodiment of a conduit according to the instant disclosure and FIG. 3B illustrates an end view of the conduit illustrated in FIG. 3A.

FIG. 9A illustrates a perspective view of the conduit flexed about a point along the center axis with the gates in the open position and FIG. 9B illustrates a perspective view of the conduit flexed about a point along the center axis with the gates in the open position.

FIG. 11A illustrates a perspective view of the conduit flexed about a point along the center axis with the gates in the closed position and FIG. 11B illustrates a perspective view of the conduit flexed about a point along the center axis with the gates in the closed position.

DETAILED DESCRIPTION

Overview

Figure 1:
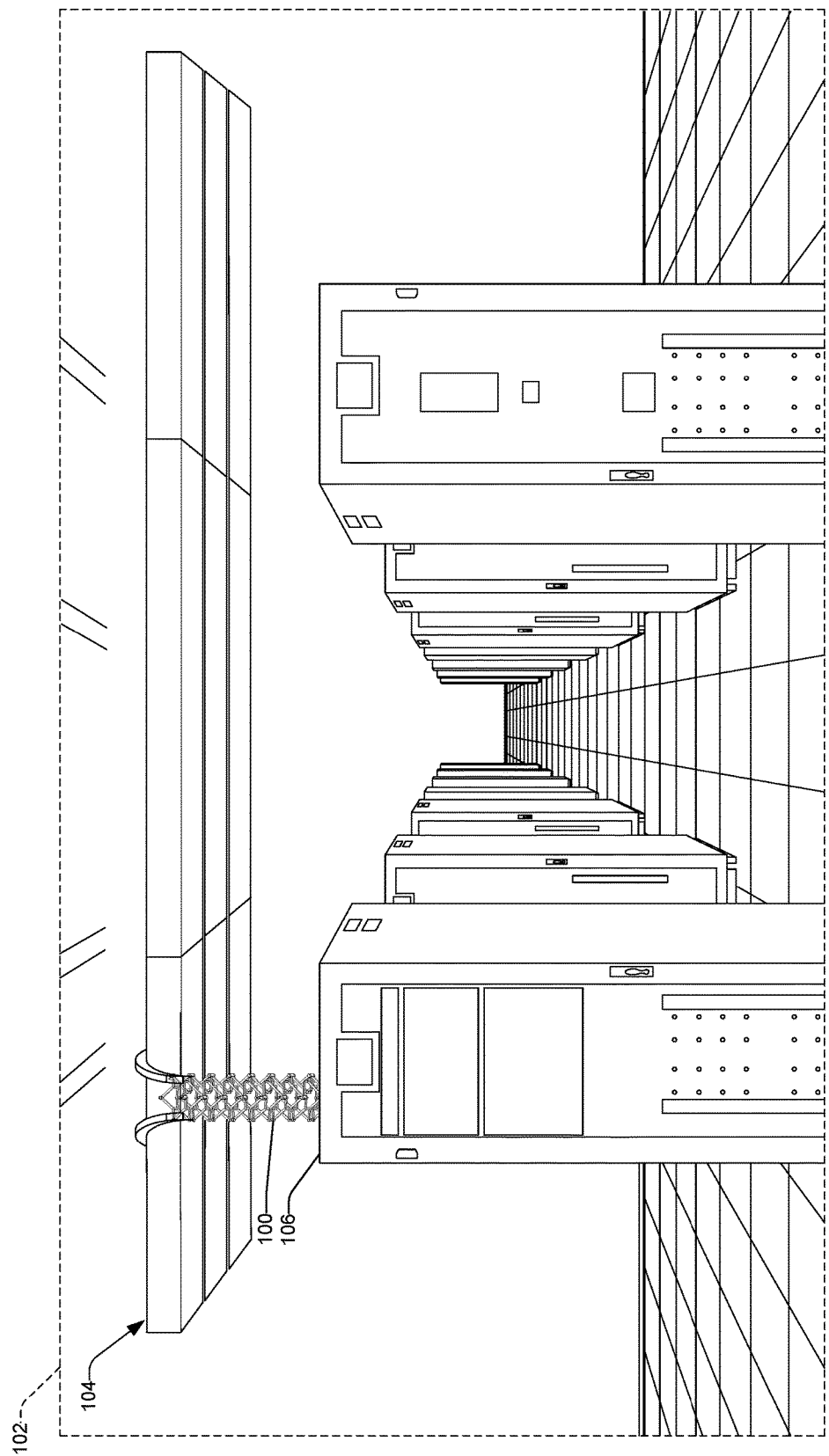
FIG. 1 illustrates an example conduit for routing connectivity cables in a telecommunication facility.

As noted above, split tubing may be used to manage and organize optical fibers, which tubing is often extruded and relatively stiff, and users (e.g., technicians, installers, mechanics, etc.) may be required to run their hands along the inside of the split of the tube making it difficult and unpleasant to manage and organize optical fibers in the split tube. This disclosure is directed to conduits for routing cables (e.g., optical fibers, cords, power cords, wires, wiring harnesses, etc.) that are relatively more easy and pleasant to use than existing split tubes, split wire loom tubing, split corrugated loom tubing, etc. The conduits may include consecutive bottom springs extending a longitudinal length, consecutive first side springs extending the longitudinal length, and consecutive second side springs extending the longitudinal length. The bottom springs, first side springs, and second side springs are flexible about a point along a center axis of the conduit. The conduits may also include a gate pivotably attached to a portion of the first side springs or to a portion of the second side springs. The gate is pivotable about the portion of the first side springs or pivotable about the portion of the second side springs while the bottom springs, first side springs, and second side springs are flexed or unflexed about a point along the center axis of the conduit. In an example situation of use, a user may open the gate while the bottom springs, first side springs, and second side springs are flexed about a point along the center axis of the conduit. The user may then manage and organize optical fibers in the conduit. Subsequent to managing and organizing the optical fibers in the conduit, the user may close the gate while the bottom springs, first side springs, and second side springs are flexed about a point along the center axis of the conduit to contain the optical fibers in the conduit.

While this application describes implementations that are described in the context of an overhead conduit for managing optical fibers in a telecommunications facility, the implementations described herein may be used in other environments and are applicable to other contexts. For example, the conduits may be located at any desired location, including overhead, below the floor, at a work station, at a desk, in a home, in an office, in a home theater, with a personal computer, with a personal work station, with an audio system, in a vehicle, in a boat, etc. In addition, the conduits may be used to manage fibers other than optical fibers, such as wires, Ethernet cables, coaxial cables, power cords, wiring harnesses, etc.

The conduits may include a first member including a first bottom spring, a first side spring, and a second side spring. The first bottom spring may have a first end opposite a second end. The first side spring may extend from the first end of the first bottom spring, and the second side may extend from the second end of the first bottom spring. A second member may include a second bottom spring having a first end opposite a second end. A third side spring may extend from the first end of the second bottom spring, and a fourth side spring may extend from the second end of the second bottom spring. A bottom link may be attached between the first bottom spring and the second bottom spring. A first side link may be attached between the first side spring and the third side spring, and a second side link may be attached between the second side spring and the fourth side spring. The first member and the second member may be flexible with respect to each other about a point on a center axis of the conduit extending a longitudinal length. At least one gate may be pivotably attached to the first side spring, and the at least one gate may be pivotable while the first member and the second member are flexed about the point on the center axis of the conduit.

In an additional, and/or alternative description, the conduits may be described as including a bottom surface extending a longitudinal length. The bottom surface may include a first bottom spring, a second bottom spring, and a bottom link attached between the first bottom spring and the second bottom spring. A first side surface, extending the longitudinal length, may include a first side spring, a second side spring, and a side link attached between the first side spring and the second side spring. A second side surface, extending the longitudinal length opposite the first side surface, may include a third side spring, a fourth side spring, and a side link attached between the third side spring and the fourth side spring. The bottom surface, the first side surface, and the second side surface may be flexible about a point along a center axis of the conduit extending the longitudinal length. At least one gate may pivotably attach to the first side surface or to the second side surface, and the at least one gate may be pivotable between an open position and a closed position while the bottom surface, the first side surface, and the second side surface are flexed about a point along the center axis of the conduit.

In yet another additional, and/or alternative description, the conduits may include a body extending a longitudinal length and having an opening extending at least a portion of the longitudinal length. The body may be flexible about a point along a center axis of the body extending the longitudinal length. The first and second attachment features of the first member may extend at least a portion of the longitudinal length of the first member. A gate may be pivotably attached to a portion of the body, and may be pivotable about the portion of the body while the body is flexed about a point along the center axis of the body.

Illustrative Conduits

FIG. 1 illustrates an example conduit 100 for routing connectivity cables in a telecommunication facility 102. A user (e.g., a technician) may install the conduit 100 in the telecommunication facility 102 for managing and organizing connectivity cables (e.g., optical fibers) in the telecommunication facility 102. For example, a user may attach the conduit 100 to an overhead trough system 104 for managing and organizing at least a portion of connectivity cables exiting from the trough system 104 to another to a piece of equipment 106, to another location, to another trough system, etc. in the telecommunication facility 102. The conduit 100 may be flexible about a center axis of the conduit 100 to provide for routing the conduit 100. For example, the conduit 100 may be flexible about a point along the center axis to provide for bending or deforming the conduit 100 from the trough system 104 and the other piece of equipment 106.

The conduit 100 may have a maximum flexibility to provide for a minimum bend radius to protect the connectivity cables. For example, the conduit 100 may be flexible about a point along the center axis up to a minimum bend radius of about 1 inch suitable for protecting the fiber optic cables that may be placed and/or routed in the conduit 100.

While FIG. 1 illustrates the conduit 100 installed in the telecommunication facility 102, the conduit 100 may be installed in a computing facility, a central office, a data center, a server room, a remote cell site, etc. Further, while FIG. 1 illustrates the conduit 100 being flexed from the trough system 104 to the piece of equipment 106, the conduit 100 may be flexed between different pieces of equipment, instead of from a trough to equipment, such as a server. That is, the conduit 100 may be arranged between any piece of equipment, components, systems, etc. to provide a conduit that corresponds with the configuration in a telecommunication facility in which the conduit is to be installed.

Figure 2:
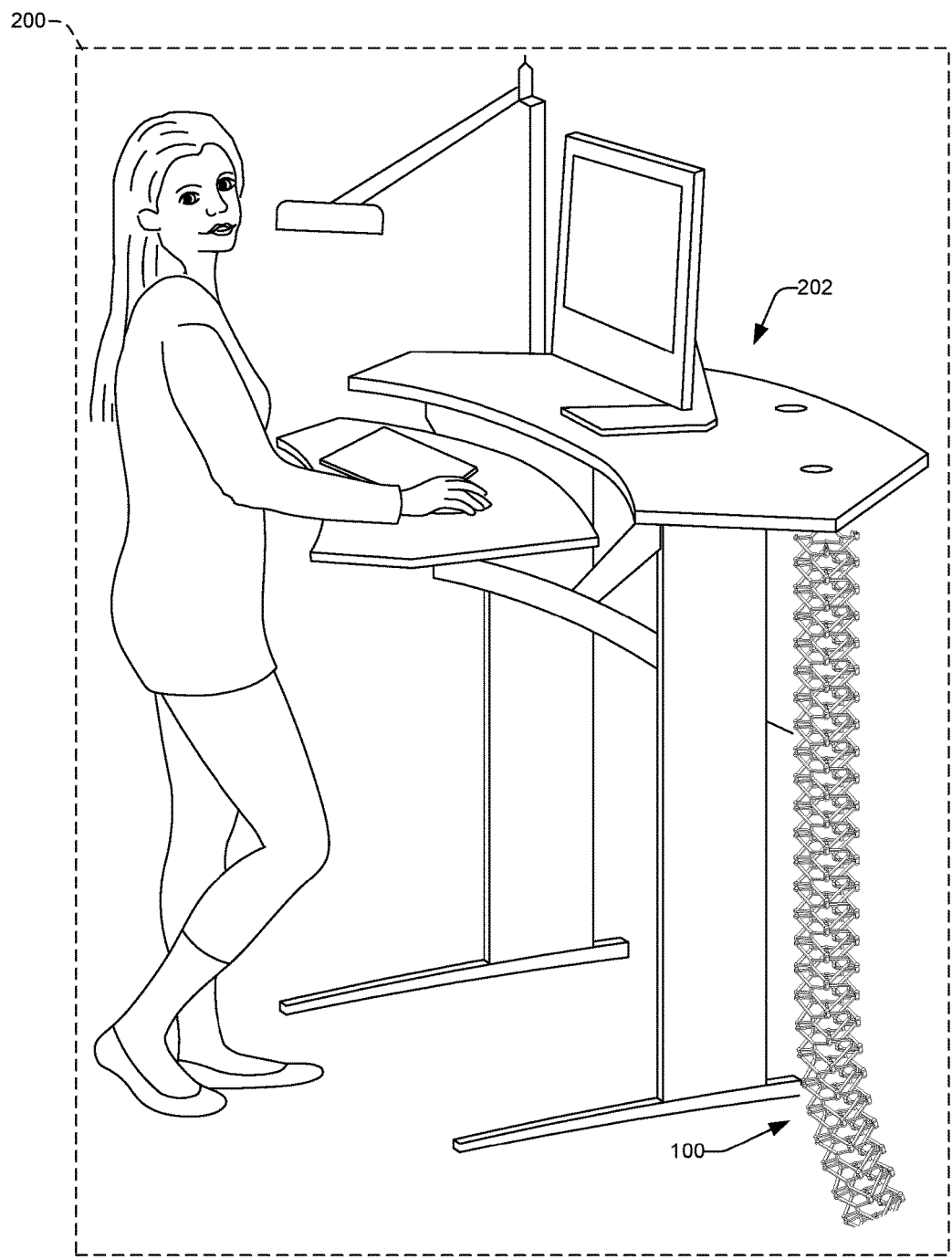
FIG. 2 illustrates the conduit illustrated in FIG. 1 as it may be used in an office.

FIG. 2 illustrates the example conduit 100 may be used in an office 200 for managing and organizing wires, Ethernet cables, coaxial cables, power cords, wiring harnesses, etc. in the office 200. For example, a user may attach the conduit 100 to a portion of a desk 202 for managing and organizing at least a portion of the cables associated with equipment arranged with the desk 202. The conduit 100 may be flexible about a point along the center axis of the conduit 100 to provide for bending or deforming the conduit 100 around portions of the desk 202, and/or between the desk 202 and another location in the office 200. The conduit 100 may be flexible about a point along the center axis of the conduit 100 to provide for bending or deforming the conduit 100 when the desk 202 is raised or lowered. For example, the desk 202 may be a height adjustable desk, and the conduit 100 may bend or deform about a point on the center axis when a user reduces or increases the height of the adjustable desk. While FIG. 1 illustrates the conduit 100 installed in the office 200, the conduit 100 may be installed in a home, a shop (e.g., a computer numerical control (CNC) machine shop), a vehicle, a toy, etc.

FIG. 3A illustrates a perspective view 300 of the example conduit 100 illustrated in FIGS. 1 and 2. The conduit 100 illustrated in FIGS. 3A-7 may be the same base conduit as in FIGS. 1 and 2, however, for clarity, the gates (to be discussed with respect to FIGS. 8A-11B) are not shown and are discussed in detail below. The conduit 100 may include a plurality of consecutively connected members 302(1), 302(2), 302(3), and 302(n) that extend successively along a longitudinal length 304. A center axis 306 of the conduit 100 extends in the direction of the longitudinal length 304. A bottom surface 308, a first side surface 310, and a second side surface 312 all extends in the direction of the longitudinal length 304. The bottom surface 308, the first side surface 310, and the second side surface 312 may be flexible about a point P on the center axis 306 of the conduit 100. For the purposes of this application, the point P is not considered to be at a fixed position on the center axis 306, rather the point P is merely confined to being along the center axis 306 at any point about which the conduit 100 becomes flexed. Further, inasmuch as the conduit 100 is structured to be flexible in multiple locations along the length thereof, there may be multiple points "P" about which the conduit 100 may be flexed in the same or different directions, depending on the use and placement of the conduit 100. Accordingly, the bottom surface 308, the first side surface 310, and the second side surface 312 may be flexible about point P (or multiple points) on the center axis 306 of the conduit 100 to prevent bending of a fiber optic cable contained in the conduit 100. Moreover, the bottom surface 308, the first side surface 310, and the second side surface 312 may be flexible about a point along the center axis 306 of the conduit 100 up to a minimum bend radius to prevent bending of a fiber optic cable contained in the conduit 100. In an embodiment, the minimum bend radius may be about 1 inch to prevent bending of a fiber optic cable contained in the conduit 100.

The bottom surface 308 may be formed of a plurality of springs linked together, the first side surface 310 may be formed of a plurality of springs linked together, and the second side surface 312 may be formed of a plurality of springs linked together (discussed in more detail below). The bottom surface springs, the first side surface springs, and the second side surface springs may stretch and/or compress and provide for the bottom surface 308, the first side surface 310, and the second side surface 312 to flex about a point along the center axis 306 of the conduit 100.

FIG. 3B illustrates an end view 314 of the conduit 100. The end view 314 illustrates that, together, the first side surface 310 and the second side surface 312 attached to the bottom surface 308 have a substantially U-shaped cross-section extending at least a portion of the longitudinal length 304.

Figure 4:
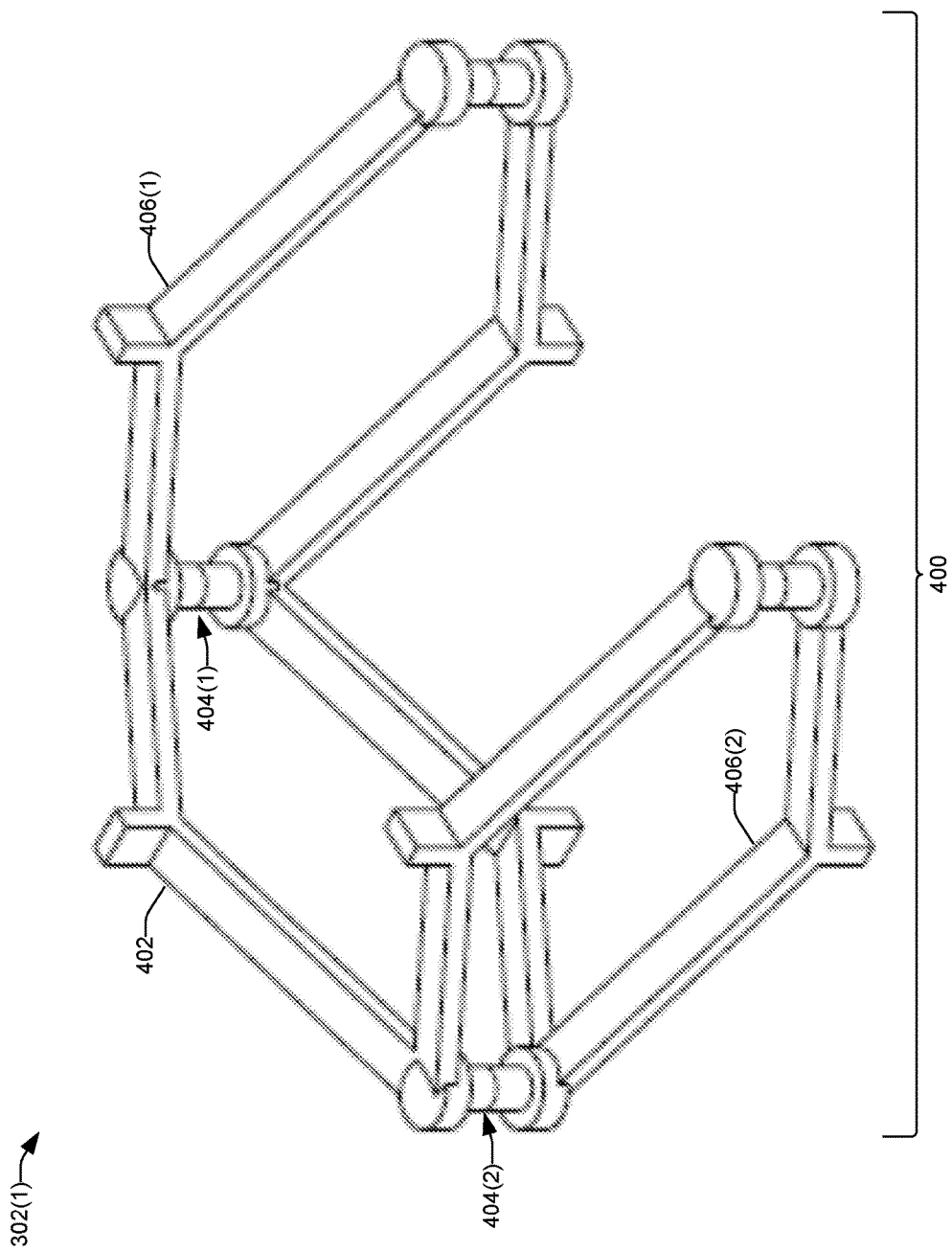
FIG. 4 illustrates a perspective view of a member of the conduit illustrated in FIG. 3.

FIG. 4 illustrates a perspective view 400 of the first member 302(1) of the plurality of members 302(1)-302(n) illustrated in FIG. 3. Perspective view 400 illustrates the first member 302(1) may include a bottom spring 402 having a first end 404(1) opposite a second end 404(2), a first side spring 406(1) extending from the first end 404(1), and a second side spring 406(2) extending from the second end 404(2). Each member of the plurality of members 302(1)-302(n) may be the same as the first member 302(1). For example, each member of the plurality of members 302(1)-302(n) may include a bottom spring having a first end opposite a second end, a first side spring extending from the first end, and a second side spring extending from the second end.

FIG. 4 illustrates the bottom spring 402, the first side spring 406(1), and the second side spring 406(2) may each have a polygonal cross-sectional profile. For example, FIG. 4 illustrates the bottom spring 402, the first side spring 406(1), and the second side spring 406(2) may each have a hexagonal cross-sectional profile. While FIG. 4 illustrates the bottom spring 402, the first side spring 406(1), and the second side spring 406(2) may each have a polygonal cross-sectional profile, one or more of the bottom spring 402, the first side spring 406(1), and the second side spring 406(2) may not have a polygonal cross-sectional profile. For example, any one of the bottom spring 402, the first side spring 406(1), and/or the second side spring 406(2) may have a curvilinear cross-section profile. Any one of the bottom spring 402, the first side spring 406(1), or the second side spring 406(2) may be formed of a flexible plastic, such as a polymer (e.g., nylon), polyethylene, polypropylene, etc.

Figure 5:
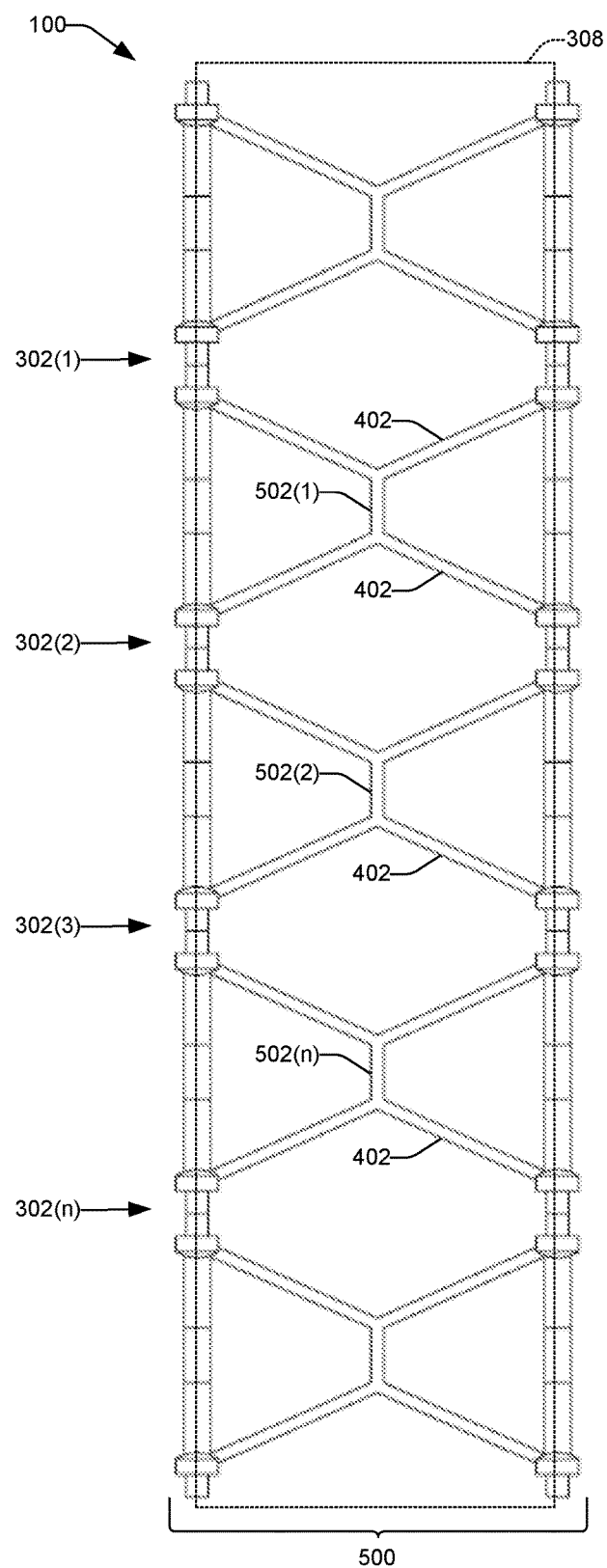
FIG. 5 illustrates a top view of the conduit illustrated in FIG. 3.

FIG. 5 illustrates a top view 500 of the conduit 100 illustrated in FIGS. 1 and 2. The conduit 100 may include a plurality of bottom links 502(1), 502(2), and 502(n). In an embodiment, the bottom link 502(1) may attach between the bottom spring 402 of the first member 302(1) and the bottom spring 402 of the second member 302(2). Likewise, as depicted, the bottom link 502(2) is attached between the bottom spring 402 of the second member 302(2) and the bottom spring 402 of the third member 302(3), and the bottom link 502(n) is attached between the bottom spring 402 of the third member 302(3) and the bottom spring 402 of the n$^{th}$ member 302(n). For the purposes of this description, despite the gaping holes through the polygonal structural shape of the "springs" (e.g., bottom spring 402, etc.) that connect to make up a linked framework, the plane of extension along the aligned edges of consecutively linked bottom springs 402 may be referred to herein as defining the bottom surface 308. As with the springs above, the bottom links 502(1)-501(n) may be formed of a flexible plastic, such as a polymer (e.g., nylon), polyethylene, polypropylene, etc.

Figure 6:
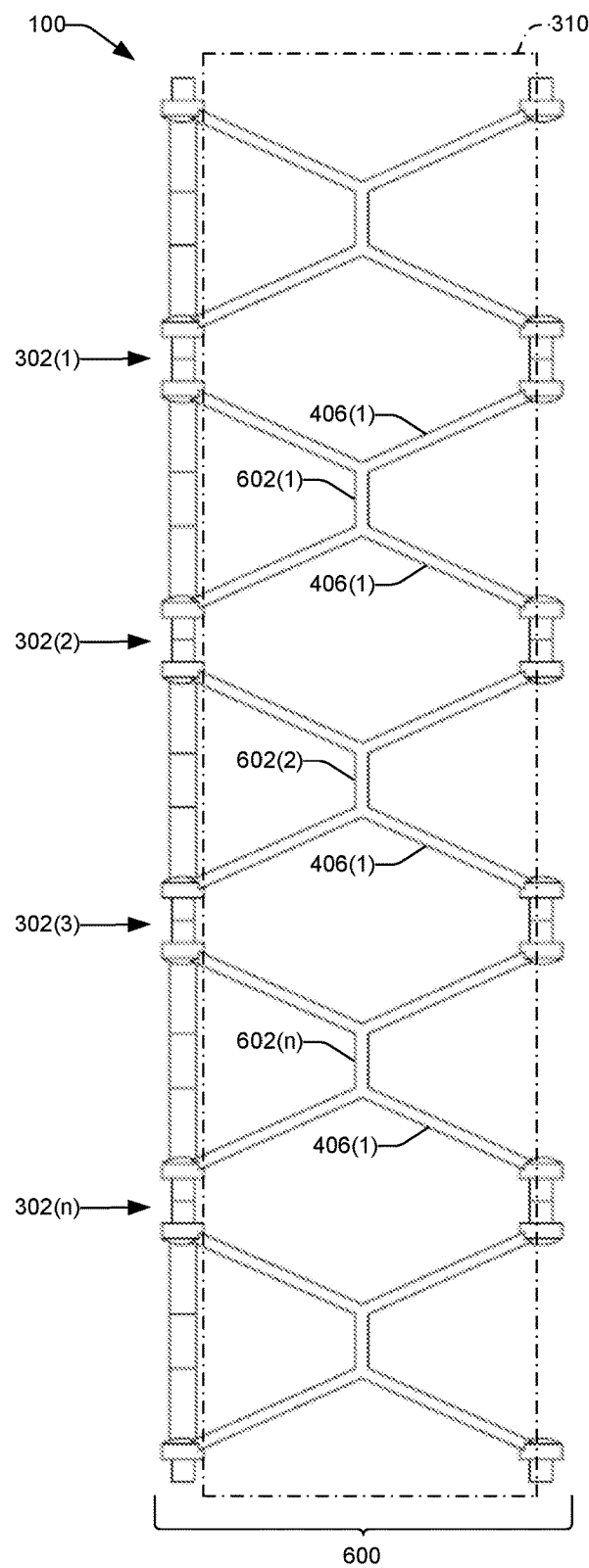
FIG. 6 illustrates a right side view of the conduit illustrated in FIG. 3.

FIG. 6 illustrates a right side view 600 of the conduit 100 illustrated in FIGS. 1 and 2. The conduit 100 may include a plurality of side links 602(1), 602(2), and 602(n). In an embodiment, the side link 602(1) may attach between the first side spring 406(1) of the first member 302(1) and the first side spring 406(1) of the second member 302(2). Likewise, as depicted the side link 602(2) is attached between the first side spring 406(1) of the second member 302(2) and the first side spring 406(1) of the third member 302(3), and the side link 602(n) is attached between the first side spring 406(1) of the third member 302(3) and the first side spring 406(1) of the n$^{th}$ member 302(n). For the purposes of this description, despite the gaping holes through the polygonal structural shape of the "springs" (e.g., first side spring 406(1), etc.) that connect to make up a linked framework, the plane of extension along the aligned edges of consecutively linked first side springs 406(1) may be referred to herein as defining the first side surface 310. As with the springs above, the side links 602(1)-602(n) may be formed of a flexible plastic, such as a polymer (e.g., nylon) polyethylene, polypropylene, etc.

Figure 7:
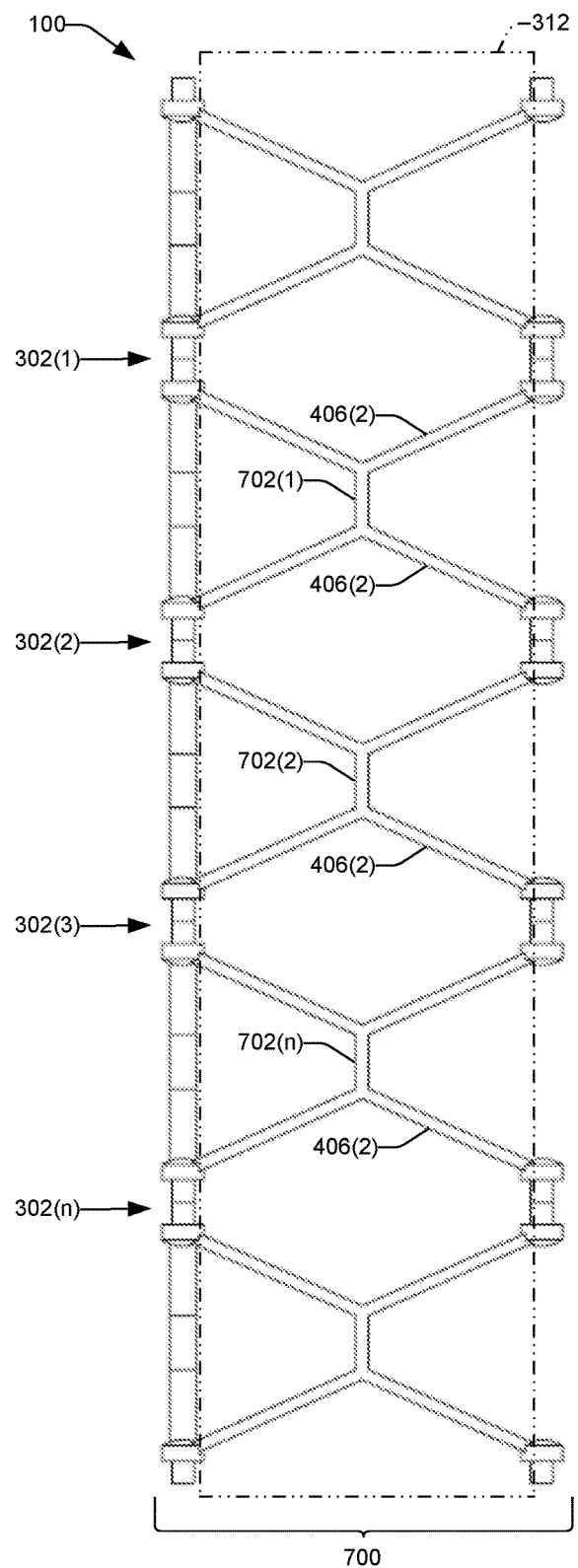
FIG. 7 illustrates a left side view of the conduit illustrated in FIG. 3.

FIG. 7 illustrates a left side view 700 of the conduit 100 illustrated in FIGS. 1 and 2. The conduit 100 may include a plurality of side links 702(1), 702(2), and 702(n). In an embodiment, the side link 702(1) may attach between the second side spring 406(2) of the first member 302(1) and the second side spring 406(2) of the second member 302(2). Likewise, as depicted the side link 702(2) is attached between the second side spring 406(2) of the second member 302(2) and the second side spring 406(2) of the third member 302(3), and the side link 702(n) is attached between the second side spring 406(2) of the third member 302(3) and the second side spring 406(2) of the n$^{th}$ member 302(n). For the purposes of this description, despite the gaping holes through the polygonal structural shape of the "springs" (e.g., second side spring 406(2), etc.) that connect to make up a linked framework, the plane of extension along the aligned edges of consecutively linked second side springs 406(2) may be referred to herein as defining the second side surface 312. As with the springs above, the side links 702(1)-702(n) may be formed of a flexible plastic such as a polymer (e.g., nylon) polyethylene, polypropylene, etc.

Figures 8A, 8B:
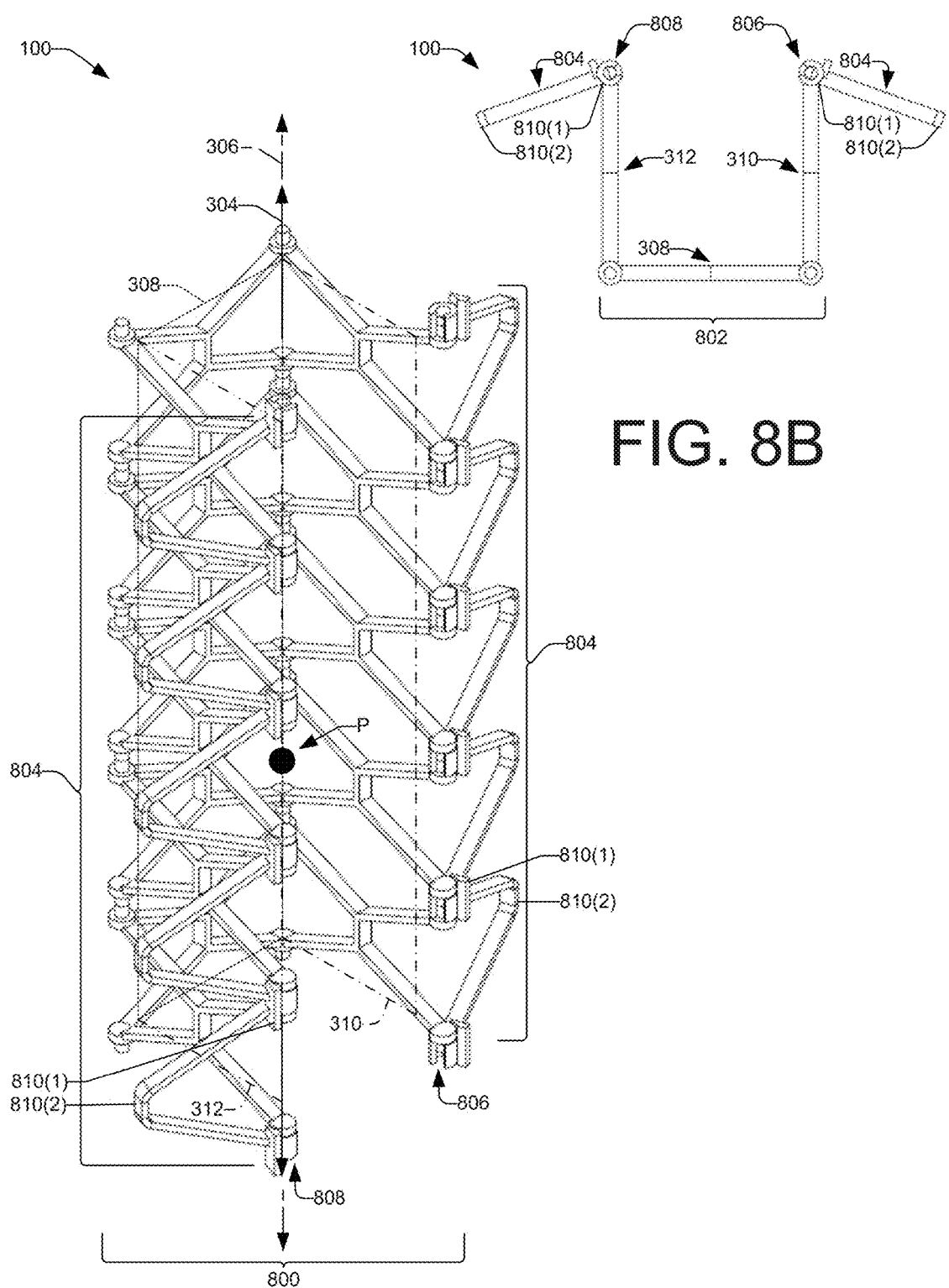
FIG. 8A illustrates a perspective view of the conduit illustrated in FIGS. 1 and 2 having gates in an open position and FIG. 8B illustrates an end view of the conduit illustrated in FIGS. 1 and 2 having gates in an open position.

FIG. 8A illustrates a perspective view 800 of the conduit 100 illustrated in FIGS. 1 and 2 having gates 804 in an open position and FIG. 8B illustrates an end view 802 of the conduit 100 illustrated in FIGS. 1 and 2 having gates 804 in an open position. The gates 804 may be pivotable between the open position and a closed position while the bottom surface 308, the first side surface 310, and the second side surface 312 are flexed about a point along the center axis 306 of the conduit 100 (described in more detail below).

FIGS. 8A and 8B illustrate the first gate 804 pivotably attached to a top portion 806 of the first side surface 310, and the second gate 804 pivotably attached to a top portion 808 of the second side surface 312. For example, the gates 804 may each have a first end 810(1) opposite a second end 810(2). The first ends 810(1) of the gates 804 may be pivotably attached to either one of the top portions 806 or 808 of the conduit 100, and the second ends 810(2) of the gates 804 may pivot about the top portions 806 or 808 of the conduit 100.

For example, the first end 810(1) of the gate 804 may be pivotably attached to the top portions 806 of the first side springs 406(1) and the first end 810(1) of the other gate 804 may be pivotably attached to the top portions 808 of the second side springs 406(2). The first end 810(1) of the gate 804 may be pivotably attached to the top portion 806 of the first side spring 406(1) of the first member 302(1) and pivotably attached to a top portion 806 of the first side spring 406(1) of the second member 302(2). The second end 810(2) of the gate 804 may pivot about the top portions 806 of the first side springs 406(1) of the first and second members 302(1) and 302(2). In another example, the first end 810(1) of the other gate 804 may be pivotably attached to the top portion 808 of the second side spring 406(2) of the first member 302(1) and pivotably attached to a top portion 808 of the second side spring 406(2) of the second member 302(2). The second end 810(2) of the other gate 804 may pivot about the top portions 808 of the second side springs 406(2) of the first and second members 302(1) and 302(2).

FIGS. 8A and 8B illustrate when the gates 804 are in the open position, the second ends 810(2) of the gates 804 are located outside of the conduit 100. For example, when the gates 804 are in the open position the second ends 810(2) of the gates 804 are positioned a distance out away from the first and second side surfaces 310 and 312. When the gates 804 are in the open position, a user may manage and organize optical fibers in the conduit 100. For example, when the gates 804 are in the open position, a user may arrange optical fibers along the bottom surface 308, the first side surface 310, and/or the second side surface 312 of the conduit 100. Subsequent to managing and organizing optical fibers inside the conduit 100, the gates 804 may be pivotably displaced to a closed position to contain the optical fibers inside the conduit 100.

FIGS. 8A and 8B illustrate illustrates two gates 804 pivotably attached to the conduit 100, any number of gates may be pivotably attached to the conduit 100. For example, one gate may be pivotably attached to the first side surface 310, or one gate may be pivotably attached to the second side surface 312. In another example, a plurality of gates may be pivotably attached to the first side surface 310, or a plurality of gates may be pivotably attached to the second side surface 312. In another example, a plurality of gates may be pivotably attached to the first side surface 310, and a plurality of gates may be pivotably attached to the second side surface 312. In another example, a plurality of gates may be pivotably attached to the first side surface 310, and one gate may be pivotably attached to the second side surface, or vice versa. The gates 804 may be formed of a flexible plastic, such as a nylon (e.g., nylon) polyethylene, polypropylene, etc.

FIG. 9A illustrates a perspective view 900 of the conduit 100 flexed 904 about a point along the center axis 306 with the gates 804 in the open position and FIG. 9B illustrates a perspective view 902 of the conduit 100 flexed 904 about a point along the center axis 306 with the gates 804 in the open position. Perspective view 900 illustrates the conduit 100 flexed 904 about a point along the center axis 306 away from the gates 804 in the open position. Perspective view 900 illustrates the bottom surface 308, the first side surface 310, and the second side surface 312 having curvilinear shapes that curve away from the center axis 306 when the conduit 100 is flexed 904 away from the gates 804 in the open position. For example, because the bottom surface 308 is formed of bottom springs 402, the first side surface 310 is formed of first side springs 406(1), and the second side surface 312 is formed of second side springs 406(2), the conduit 100 may be flexed 904 away from the gates 804. For example, one or more of the bottom springs 402 may be compressed, while one or more of the first and second side springs 406(1) and 406(2) may be stretched when the conduit is flexed 904 away from the gates 804.

The gates 804 may be pivotably displaced from the open position to a closed position, or vice versa, when the conduit 100 is flexed 904 away from the gates 804. For example, one or more of the first ends 810(1) of the gates 808 may be stretched along with the stretching of the first and second side springs 406(1) and 406(2) to provide for the second ends 810(2) of the gates 804 to pivot about the top portions 806 and 808 of the conduit 100.

Perspective view 902 illustrates the conduit 100 flexed 904 about a point along the center axis 306 toward the first side surface 310 with the gates 804 in the open position. Perspective view 902 illustrates the bottom surface 308, the first side surface 310, and the second side surface 312 having curvilinear shapes that curve away from the center axis 306 when the conduit 100 is flexed 904 toward the first side surface 310. For example, one or more of the first side springs 406(1) may be compressed, while one or more of the bottom springs 402 and the second side springs 406(2) may be stretched when the conduit is flexed 904 toward the first side surface 310.

The gates 804 may be pivotably displaced from the open position to a closed position, or vice versa, when the conduit 100 is flexed 904 toward the first side surface 310. For example, one or more of the first ends 810(1) of the gate 808 pivotably attached to the top portion 804 of the first side surface 310 may be compressed along with the compression of the first side springs 406(1), and one or more of the first ends 810(1) of the other gate 808 pivotably attached to the top portion 808 of the second side surface 312 may be stretched along with the stretching of the second side springs 406(2), to provide for the second ends 810(2) of the gates 804 to pivot about the top portions 806 and 808 of the conduit 100.

While perspective view 900 illustrates the conduit 100 flexed 904 about a point along the center axis 306 away from the gates 804 in the open position, the conduit 100 may be flexed 904 about a point along the center axis 306 toward the gates 804 in the open position. For example, one or more of the bottom springs 402 may be stretched, while one or more of the first and second side springs 406(1) and 406(2) may be compressed when the conduit is flexed 904 toward the gates 804 in the open position. Further, while perspective view 902 illustrates the conduit 100 flexed 904 about a point along the center axis 306 toward the first side surface 310 with the gates 804 in the open position, the conduit 100 may be flexed 904 about a point along the center axis 306 toward the second side surface 312 with the gates 804 in the open position. For example, one or more of the second side springs 406(2) may be compressed, while one or more of the bottom springs 402 and the first side springs 406(1) may be stretched when the conduit 100 is flexed 904 toward the second side surface 312 when the gates 804 are in the open position. Further, the conduit 100 may be flexed about a point along the center axis 306 in other directions. For example, the conduit 100 may be flexed about a point along the center axis 306 toward a corner of the conduit 100. The gates 804 may be pivotably displaced from the open position to the closed position, or vice versa, when the conduit 100 is flexed in the other directions.

FIGS. 9A and 9B illustrate the plurality of members 302(1)-302(n) flexing with respect to each other about a point along the center axis 306 of the conduit 100 when the conduit is flexed 904 about a point along the center axis 306. For example, the first member 302(1) may be flexible with respect to the second member 302(2), and the second member 302(2) may be flexible with respect to the $n^{th}$ member 302(n) about a point along the center axis 306. The plurality of members 302(1)-302(n) may be flexible with respect to each other about a point along the center axis 306 of the conduit 100 to prevent bending of a fiber optic cable contained in the plurality of members 302(1)-302(n). For example, the plurality of members 302(1)-302(n) may be flexible with respect to each other about a point along the center axis 306 of the conduit 100 up to a minimum bend radius to prevent bending of a fiber optic cable contained in the plurality of members 302(1)-302(n). The minimum bend radius may be about 1 inch to prevent bending of a fiber optic cable contained in the conduit 100.

Figures 10A, 10B:
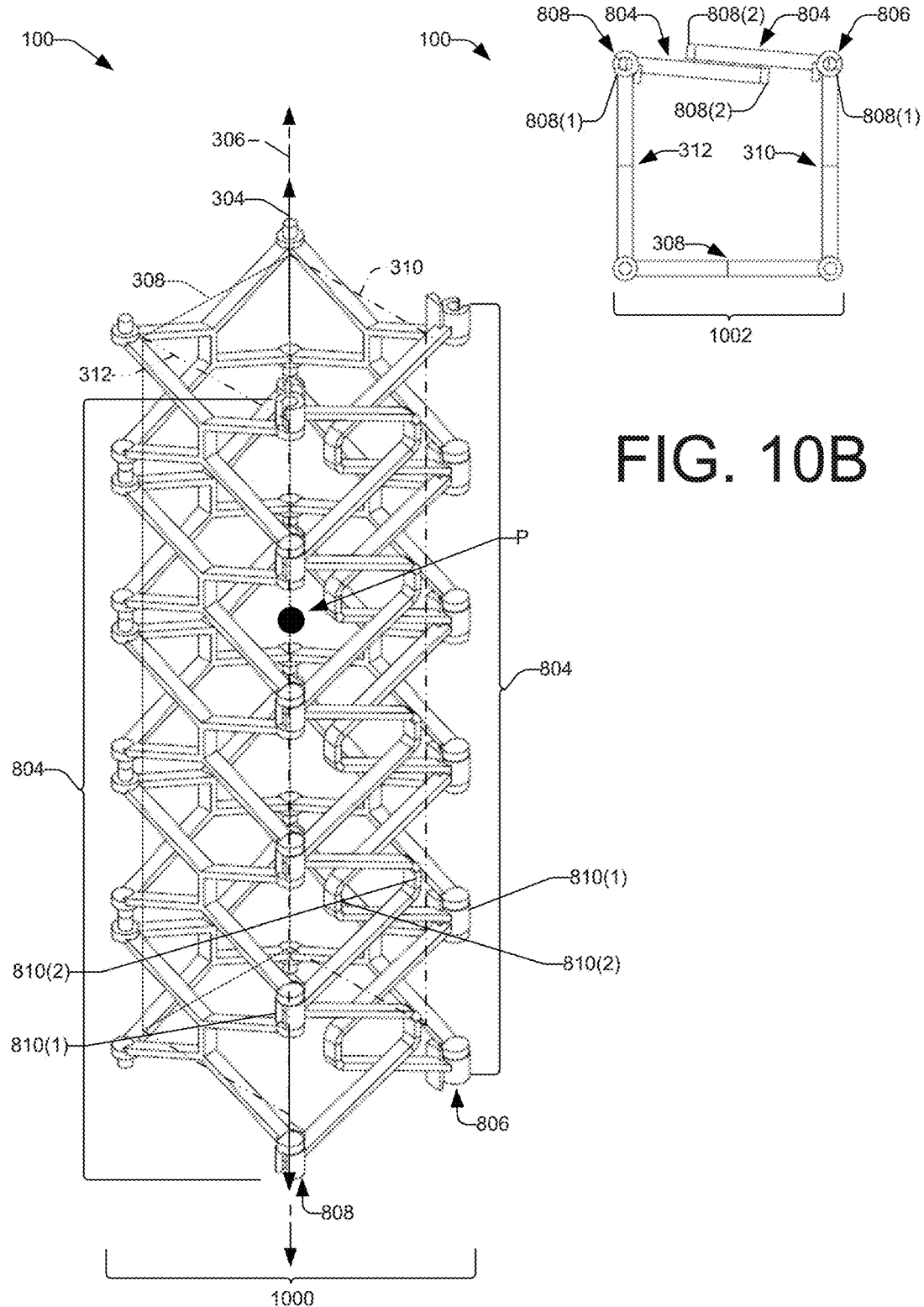
FIG. 10A illustrates a perspective view of the conduit illustrated in FIGS. 1 and 2 with the gates in a closed position and FIG. 10B illustrates an end view of the conduit illustrated in FIGS. 1 and 2 with the gates in a closed position.

FIG. 10A illustrates a perspective view 1000 of the conduit 100 illustrated in FIGS. 1 and 2 with the gates 804 in a closed position and FIG. 10B illustrates an end view 1002 of the conduit 100 illustrated in FIGS. 1 and 2 with the gates 804 in a closed position. FIGS. 10A and 10B illustrate when the gates 804 are in the closed position, the second ends 810(2) of the gates 804 are located inside of the conduit 100. For example, when the gates 804 are in the closed position the second ends 810(2) of the gates 804 are positioned a distance in toward the first and second side surfaces 310 and 312. When the gates 804 are in the closed position, the gates 804 may contain optical fibers in the conduit 100. For example, when the gates 804 are in the closed position, the optical fibers may be contained inside the conduit along the bottom surface 308, the first side surface 310, and/or the second side surface 312 of the conduit 100.

FIG. 11A illustrates a perspective view 1100 of the conduit 100 flexed 904 about a point along the center axis 306 with the gates 804 in the closed position and FIG. 11B illustrates a perspective view 1102 of the conduit 100 flexed 904 about a point along the center axis 306 with the gates 804 in the closed position. Perspective view 1100 illustrates the conduit 100 flexed 904 about a point along the center axis 306 away toward the gates 804 in the closed position. Similar to when the gates 804 are in the open position, perspective view 1100 illustrates the bottom surface 308, the first side surface 310, and the second side surface 312 having curvilinear shapes that curve away from the center axis 306 when the conduit 100 is flexed 904 away from the gates 804 in the closed position.

Perspective view 1102 illustrates the conduit 100 flexed 904 about a point along the center axis 306 toward the first side surface 310 with the gates 804 in the closed position. Similar to when the gates 804 are in the open position, perspective view 1102 illustrates the bottom surface 308, the first side surface 310, and the second side surface 312 having curvilinear shapes that curve away from the center axis 306 when the conduit 100 is flexed 904 toward the first side surface 310.

While perspective view 1100 illustrates the conduit 100 flexed 904 about a point along the center axis 306 away from the gates 804 in the closed position, the conduit 100 may be flexed 904 about a point along the center axis 306 toward the gates 804 in the closed position. For example, one or more of the bottom springs 402 may be stretched, while one or more of the first and second side springs 406(1) and 406(2) may be compressed when the conduit is flexed 904 toward the gates 804 in the closed position. Further, while perspective view 1102 illustrates the conduit 100 flexed 904 about a point along the center axis 306 toward the first side surface 310 with the gates 804 in the closed position, the conduit 100 may be flexed 904 about a point along the center axis 306 toward the second side surface 312 with the gates 804 in the closed position. For example, one or more of the second side springs 406(2) may be compressed, while one or more of the bottom springs 402 and the first side springs 406(1) may be stretched when the conduit 100 is flexed 904 toward the second side surface 312 when the gates 804 are in the closed position.

Figure 12:
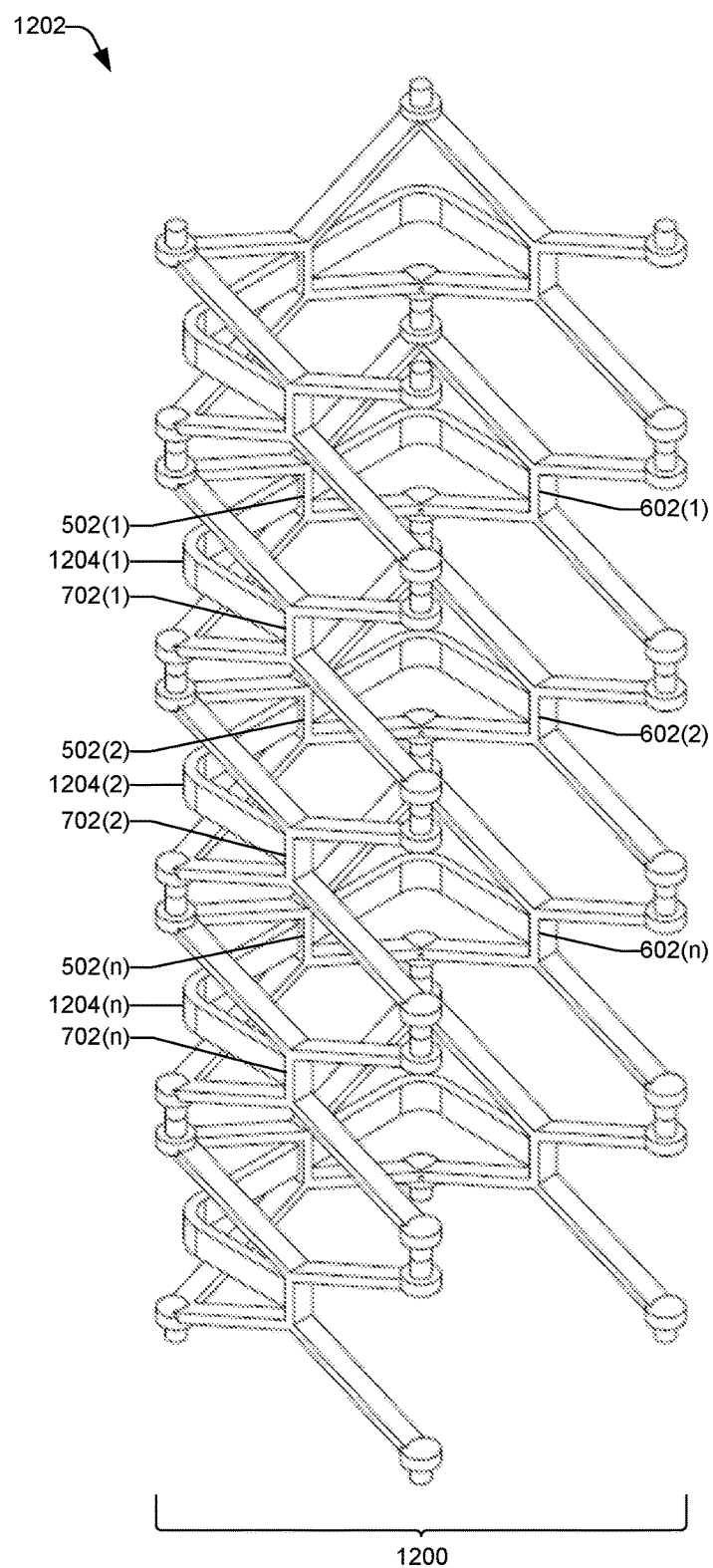
FIG. 12 illustrates a perspective view of another embodiment of a conduit according to the instant disclosure.

FIG. 12 illustrates a perspective view 1200 of an embodiment of a conduit 1202. The conduit may include a plurality of bumpers 1204(1), 1204(2), and 1204(n). A first end of each bumper of the plurality of bumpers 1204(1)-1204(n) may be attached to the first side surface 310 of the conduit 100, and a second end of each bumper of the plurality of bumpers 1204(1)-1204(n) may be attached to the second side surface 312 of the conduit 100.

For example, each bumper of the plurality of bumpers 1204(1)-1204(n) may be attached to the links of the conduit 100. For example, bumper 1204(1) may be attached to the bottom link 502(1) and the side links 602(1) and 702(1), bumper 1204(2) may be attached to the bottom link 502(2) and side links 602(2) and 702(2), and bumper 1202(n) may be attached to the bottom link 502(n) and side links 602(n) and 702(n).

The plurality of bumpers 1204(1)-1204(n) may provide added protection for optical fibers contained in the conduit 100. For example, the plurality of bumpers 1204(1)-1204(n) may be arranged to make contact with obstructions frames, chassis, trays, desks, etc. proximate to the conduit 100. For example, the plurality of bumpers 1204(1)-1204(n) may be arranged to make contact with a corner (e.g., a corner of a frame, a corner of a chassis, a corner of a tray, a corner of a desk, etc.) to prevent the optical fibers contained in the conduit 100 form coming into contact with the corner. The plurality of bumpers 1204(1)-1204(n) may be formed of a flexible plastic, such as a polymer (e.g., nylon), polyethylene, polypropylene, etc.

Figure 13:
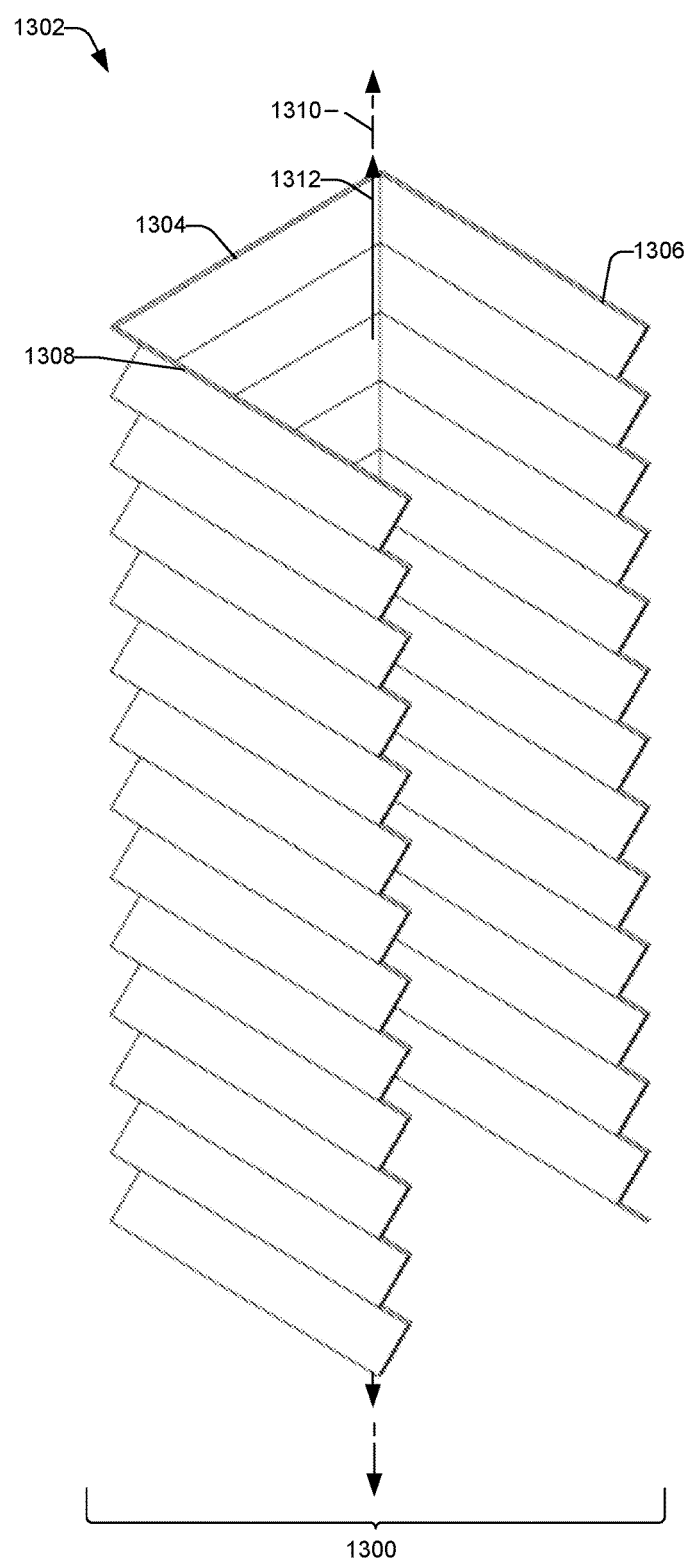
FIG. 13 illustrates a perspective view of another embodiment of a conduit for routing connectivity cables.

FIG. 13 illustrates a perspective view 1300 of another example conduit 1302 for routing connectivity cables. The conduit 1302 may include a bottom surface 1304 that is completely enclosed, a first side surface 1306 that it is completely enclosed, and a second side surface 1308 that is completely enclosed.

Similar to the conduits 100 and 1202, the bottom surface 1304, the first side surface 1306, and the second side surface 1308 may be flexible about a center axis 1310 of the conduit 1300. The bottom surface 1304, the first side surface 1306, and the second side surface 1308 may extend along a longitudinal length 1312. The bottom surface 1304, the first side surface 1306, and the second side surface 1308 may be a molded unit. Similar to the conduit 100, the first side surface 1306 and the second side surface 1308 attached to the bottom surface 1304 may have a substantially U-shaped cross-section extending at least a portion of the longitudinal length 1312.

Figure 14:
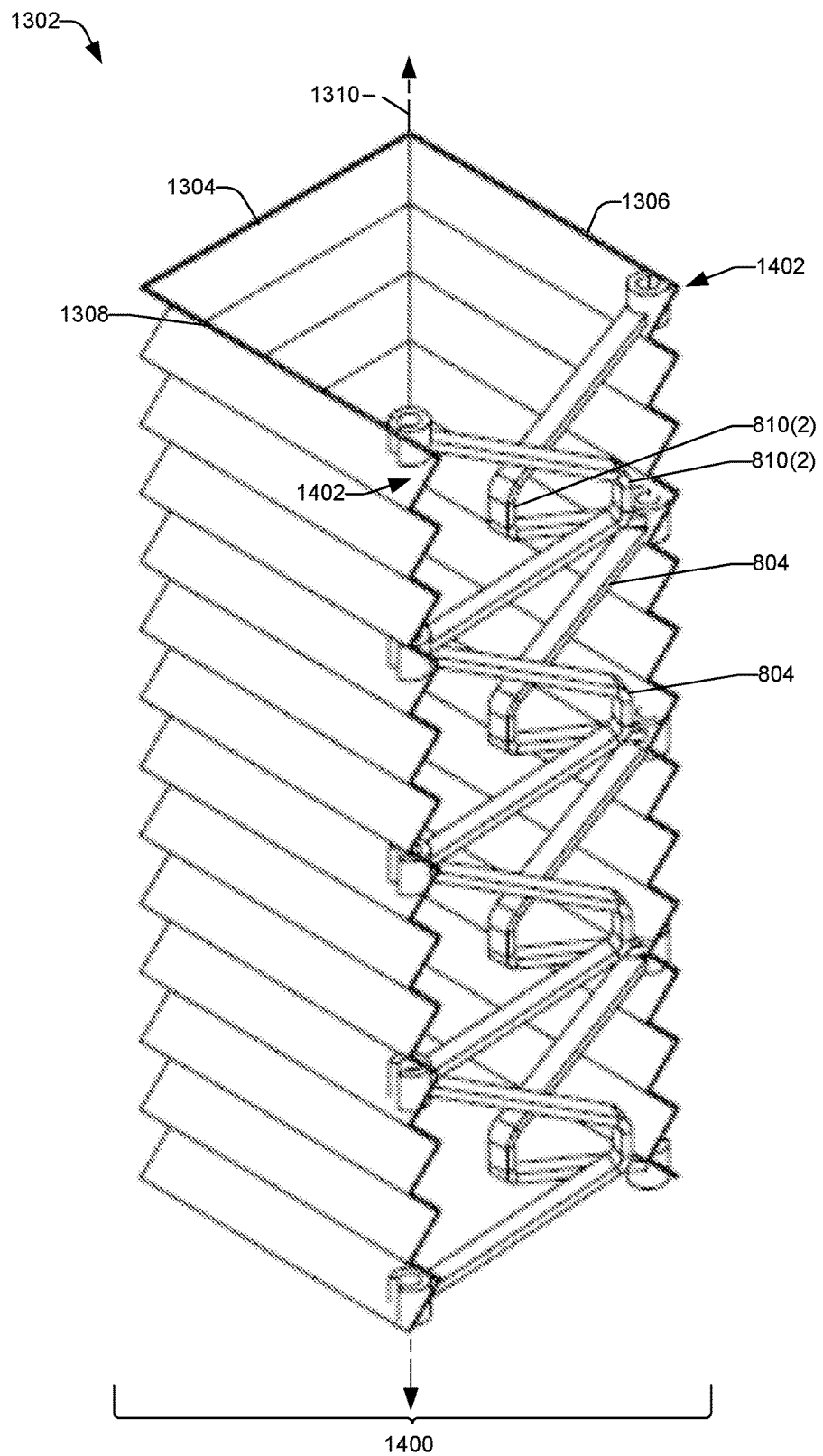
FIG. 14 illustrates a perspective view of the conduit illustrated in FIG. 13 with gates in a closed position.

FIG. 14 illustrates a perspective view 1400 of the conduit 1302 illustrated in FIG. 13 with gates 804 in a closed position. Gates 804 may be pivotably attached to top portions 1402 of the first side surface 1306 and top portions 1402 of the second side surface 1308. For example, the first ends 810(1) of the gates 804 may be pivotably attached to the top portions 1402 of the first and second side surfaces 1306 and 1308. FIG. 14 illustrates when the gates 804 are in the closed position, the second ends 810(2) of the gates 804 are located inside of the conduit 1302. For example, when the gates 804 are in the closed position the second ends 810(2) of the gates 804 are positioned a distance in toward the first and second side surfaces 1306 and 1308. When the gates 804 are in the open position, the second ends 810(2) of the gates 804 may be located outside of the conduit 1302. The gates 804 may be pivotable between the open position and a closed position while the bottom surface 1304, the first side surface 1306, and the second side surface 1308 are flexed about a point along the center axis 1310 of the conduit 1302.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:
1. A conduit comprising:
   a first member including:

a first bottom spring having a first end opposite a second end,
a first side spring extending from the first end of the first bottom spring, and
a second side spring extending from the second end of the first bottom spring;
a second member including:
a second bottom spring having a first end opposite a second end,
a third side spring extending from the first end of the second bottom spring, and
a fourth side spring extending from the second end of the second bottom spring;
a bottom link attached between the first bottom spring and the second bottom spring;
a first side link attached between the first side spring and the third side spring; and
a second side link attached between the second side spring and the fourth side spring; and
wherein the first member and the second member are flexible with respect to each other about a point on a center axis of the conduit, the center axis extending a longitudinal length.

2. The conduit of claim 1, further comprising at least one gate including a first end opposite a second end, the first end pivotably attached to a top portion of the first side spring and pivotably attached to a top portion of the third side spring, and
wherein the second end of the at least one gate is pivotable about the top portions of the first side spring and the third side spring while the first member and the second member are flexed about the point on the center axis of the conduit.

3. The conduit of claim 1, wherein at least one of the first member or the second member have a substantially U-shaped cross-section.

4. The conduit of claim 1, further comprising a bumper including a first end opposite a second end, the first end attached to first side link or attached to the second side link, and the second end attached to the bottom link.

5. The conduit of claim 1, wherein the first member and the second member are flexible with respect to each other about the point on the center axis of the conduit up to a minimum bend radius to prevent bending of a fiber optic cable contained in the first member and the second member.

6. The conduit of claim 1, wherein any one of the first bottom spring, the second bottom spring, the first side spring, the second side spring, the third side spring, or the fourth side spring has a polygonal cross-sectional profile.

7. The conduit of claim 1, wherein any one of the first bottom spring, the second bottom spring, the first side spring, the second side spring, the third side spring, or the fourth side spring is formed of a flexible plastic.

8. A conduit comprising:
a bottom surface extending a longitudinal length, the bottom surface including a first bottom spring, a second bottom spring, and a bottom link attached between the first bottom spring and the second bottom spring;
a first side surface extending the longitudinal length, the first side surface including a first side spring, a second side spring, and a side link attached between the first side spring and the second side spring;
a second side surface extending the longitudinal length opposite the first side surface, the second side surface including a third side spring, a fourth side spring, and a side link attached between the third side spring and the fourth side spring; and
wherein the bottom surface, the first side surface, and the second side surface are flexible about a point on a center axis of the conduit, the center axis extending the longitudinal length.

9. The conduit of claim 8, further comprising at least one gate pivotably attached to a top portion of the first side surface or pivotably attached to a top portion of the second side surface, the at least one gate is pivotable between an open position and a closed position while the bottom surface, the first side surface, and the second side surface are flexed about the point on the center axis of the conduit.

10. The conduit of claim 8, wherein the first member or the second member have a substantially U-shaped cross-section.

11. The conduit of claim 8, further comprising a bumper including a first end opposite a second end, the first end attached to the side link attached between the first side spring and the second side spring or attached to the side link attached between the third side spring and the fourth side spring, and the second end attached to the bottom link.

12. The conduit of claim 8, wherein the bottom surface, the first side surface, and the second side surface are flexible about the point on the center axis of the conduit up to a minimum bend radius to prevent bending of a fiber optic cable contained in the conduit.

13. The conduit of claim 8, wherein any one of the first bottom spring, the second bottom spring, the first side spring, the second side spring, the third side spring, or the fourth side spring has a polygonal cross-sectional.

14. The conduit of claim 8, wherein any one of the first bottom spring, the second bottom spring, the first side spring, the second side spring, the third side spring, or the fourth side spring is formed of a flexible plastic.

15. A conduit comprising:
a first bottom spring linked to a second bottom spring so as to define a bottom surface of the conduit extending a longitudinal length;
a first side spring linked to a second side spring so as to define a first side surface extending the longitudinal length and attached to the bottom surface;
a third side spring linked to a fourth side spring so as to define a second side surface extending the longitudinal length and attached to the bottom surface opposite the first side surface.

16. The conduit of claim 15, wherein the first side surface and the second side surface attached to the bottom surface have a substantially U-shaped cross-section extending at least a portion of the longitudinal length.

17. The conduit of claim 15, further comprising a bumper including a first end opposite a second end, the first end attached to the first side surface and the second side surface, and the second end attached to the bottom surface.

18. The conduit of claim 15 wherein the bottom surface, the first side surface, and the second side surface are flexible about a point on a center axis of the conduit, the center axis extending the longitudinal length.

19. The conduit of claim 15, wherein any one of the first bottom spring, the second bottom spring, the first side spring, the second side spring, the third side spring, or the fourth side spring has a polygonal cross-sectional profile.

20. The conduit of claim 15, wherein any one of the first bottom spring, the second bottom spring, the first side spring, the second side spring, the third side spring, or the fourth side spring is formed of a flexible plastic.

21. A conduit comprising:
a body extending a longitudinal length, the body having an opening extending at least a portion of the longitudinal length, and wherein the body is flexible about a point on a center axis of the body, the center axis extending the longitudinal length; and a gate including a first end opposite a second end, the first end pivotably attached to a portion of the body, wherein the second end is pivotable about the portion of the body while the body is flexed about the point on the center axis of the body.

* * * * *